US008746232B2

(12) United States Patent
Kanai (10) Patent No.: US 8,746,232 B2
(45) Date of Patent: Jun. 10, 2014

(54) HOT WATER SUPPLY SYSTEM

(75) Inventor: Yasushi Kanai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 993 days.

(21) Appl. No.: 12/839,725

(22) Filed: Jul. 20, 2010

(65) Prior Publication Data

US 2011/0030673 A1 Feb. 10, 2011

(30) Foreign Application Priority Data

Aug. 7, 2009 (JP) .................................. 2009-185135
Aug. 7, 2009 (JP) .................................. 2009-185136

(51) Int. Cl.
*F24J 2/40* (2006.01)

(52) U.S. Cl.
USPC ................. 126/587; 126/593; 126/609; 290/2

(58) Field of Classification Search
USPC ................... 126/615, 587; 165/236; 315/152; 340/425.5
See application file for complete search history.

(56) References Cited

U.S. PATENT DOCUMENTS

| 2,396,338 | A | * | 3/1946 | Newton | 165/236 |
| 4,010,734 | A | * | 3/1977 | Chayet | 126/587 |
| 4,052,001 | A | * | 10/1977 | Vogt | 126/585 |
| 4,173,994 | A | * | 11/1979 | Hiser | 165/48.2 |
| 4,180,209 | A | * | 12/1979 | Frissora | 237/2 A |
| 4,196,718 | A | * | 4/1980 | Neustein | 126/587 |
| 4,232,657 | A | * | 11/1980 | Killorin | 126/592 |
| 4,237,863 | A | * | 12/1980 | Harrison | 126/585 |
| 4,285,333 | A | * | 8/1981 | Tanaka et al. | 126/586 |
| 4,300,536 | A | * | 11/1981 | Taschuk | 126/615 |
| 4,340,030 | A | * | 7/1982 | Molivadas | 126/635 |
| 4,345,583 | A | * | 8/1982 | Morin | 126/615 |
| 4,378,908 | A | * | 4/1983 | Wood | 237/2 B |
| 4,564,003 | A | * | 1/1986 | Iwanicki et al. | 126/615 |
| 4,621,613 | A | * | 11/1986 | Krumhansl | 126/563 |
| 5,174,128 | A | * | 12/1992 | Bourne et al. | 62/373 |
| 6,160,318 | A | * | 12/2000 | Komura | 290/2 |
| 8,095,245 | B1 | * | 1/2012 | Mannepalli et al. | 700/291 |
| 8,224,495 | B2 | * | 7/2012 | Weaver et al. | 700/288 |
| 8,334,489 | B2 | * | 12/2012 | Beardsworth et al. | 250/203.4 |
| 2002/0108745 | A1 | * | 8/2002 | Kimura | 165/236 |
| 2004/0254686 | A1 | * | 12/2004 | Matsui et al. | 700/291 |
| 2007/0156257 | A1 | * | 7/2007 | Peters | 700/22 |

(Continued)

FOREIGN PATENT DOCUMENTS

JP 7-098157 A 4/1995
JP 2005-226924 A 8/2005

*Primary Examiner* — Steven B McAllister
*Assistant Examiner* — George R Blum
(74) *Attorney, Agent, or Firm* — Carrier Blackman & Associates, P.C.; William D. Blackman; Joesph P. Carrier (57) ABSTRACT

In a hot water supply system having a solar heater that heats a heating medium with absorbed solar heat, a cogeneration unit that heats the medium by heat exhausted from an engine, a hot water supply unit with a heat exchanger for heat-exchanging between the medium and water supplied from a water supply source to generate the hot water, a medium circulator that circulates the medium among the solar heater, cogeneration unit and heat exchanger, an electric heater that heats the hot water with the power generated by the generator, a heat absorption amount to be adsorbed by the solar heater is estimated and operations of the cogeneration unit and the electric heater are controlled based on the estimated heat absorption amount, thereby enabling to improve energy efficiency of the entire system.

18 Claims, 6 Drawing Sheets

(56) References Cited

U.S. PATENT DOCUMENTS

| | | | |
|---|---|---|---|
| 2008/0262857 A1* | 10/2008 | Perera | 705/1 |
| 2008/0289334 A1* | 11/2008 | Orosz et al. | 60/641.8 |
| 2009/0020281 A1* | 1/2009 | Ueda et al. | 165/287 |
| 2009/0139513 A1* | 6/2009 | Davis | 126/615 |
| 2009/0301687 A1* | 12/2009 | Watts | 165/48.2 |
| 2010/0006087 A1* | 1/2010 | Gilon et al. | 126/572 |
| 2010/0083950 A1* | 4/2010 | Bloxam | 126/585 |
| 2010/0252029 A1* | 10/2010 | Kanai | 126/643 |
| 2010/0257882 A1* | 10/2010 | Penev et al. | 62/235.1 |
| 2010/0263711 A1* | 10/2010 | Kanai | 136/246 |
| 2010/0326428 A1* | 12/2010 | Engelhart | 126/609 |
| 2011/0035070 A1* | 2/2011 | Kanai | 700/288 |
| 2011/0100004 A1* | 5/2011 | Al-Mazeedi | 60/641.8 |
| 2012/0103395 A1* | 5/2012 | Prengler et al. | 136/248 |
| 2012/0325290 A1* | 12/2012 | Gizara | 136/248 |

* cited by examiner

HOT WATER SUPPLY SYSTEM

FIELD OF THE INVENTION

This invention relates to a hot water supply system.

DESCRIPTION OF THE RELATED ART

Conventionally, there is known a hybrid hot water supply system having a solar heater that heats water (to be supplied) using solar heat and an electric heater that further heats the heated water using commercial power, as taught, for example, by Japanese Laid-Open Patent Application No. 2005-226924 ('924). In such the hybrid hot water supply system disclosed in '924, late-night power is used by the electric heater to reduce the cost of heating water.

Another hot water supply system having a solar heater is widely known, as taught, for example, by Japanese Laid-Open Patent Application No. Hei 7 (1995)-98157 ('157). The hot water supply system in '157 includes determination means for determining whether snow accumulates on a solar heater and an electric heating wire that is installed in the solar heater and is supplied with power from a power source to generate heat, and when the snow accumulation is determined, the heating wire is operated to generate heat to melt the snow. Specifically, even when snow accumulates on the solar heater, the solar heater can surely absorb solar heat to heat water (to be supplied) by melting snow.

SUMMARY OF THE INVENTION

In the system disclosed in '924 where water (to be supplied) is heated using low-cost late-night power, since a certain period of time elapses after heating the water until the evening in which most of the heated water is actually supplied, another heat (electric power) is separately required to keep the temperature of heated water for a long period of time. It disadvantageously degrades energy efficiency of the entire hot water supply system.

In the system disclosed in '157 where the configuration to melt the accumulated snow by heat generated by the heating wire is employed, since power is additionally needed to operate the heating wire, it also degrades energy efficiency of the entire hot water supply system.

An object of this invention is therefore to overcome the foregoing problem by providing a hot water supply system that can improve energy efficiency of the entire system.

In order to achieve the object, this invention provides a hot water supply system adapted to generate hot water to be supplied to a hot water destination, comprising: a solar heater that absorbs solar heat and heats a heating medium with the absorbed solar heat; a cogeneration unit that has an internal combustion engine and a generator driven by the engine to generate power to be supplied to a power destination, and heats the heating medium by heat exhausted from the engine; a hot water supply unit that has a heat exchanger for heat-exchanging between the heating medium and water supplied from a water supply source to generate the hot water; a heating medium circulator that circulates the heating medium among the solar heater, the cogeneration unit and the heat exchanger of the hot water supply unit; an electric heater that heats the hot water with the power generated by the generator of the cogeneration unit; a heat absorption amount estimator that estimates a heat absorption amount to be adsorbed by the solar heater; and a controller that controls operations of the cogeneration unit and the electric heater based on the estimated heat absorption amount.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A hot water supply system according to an embodiment of the invention will now be explained with reference to the attached drawings.

Figure 1:
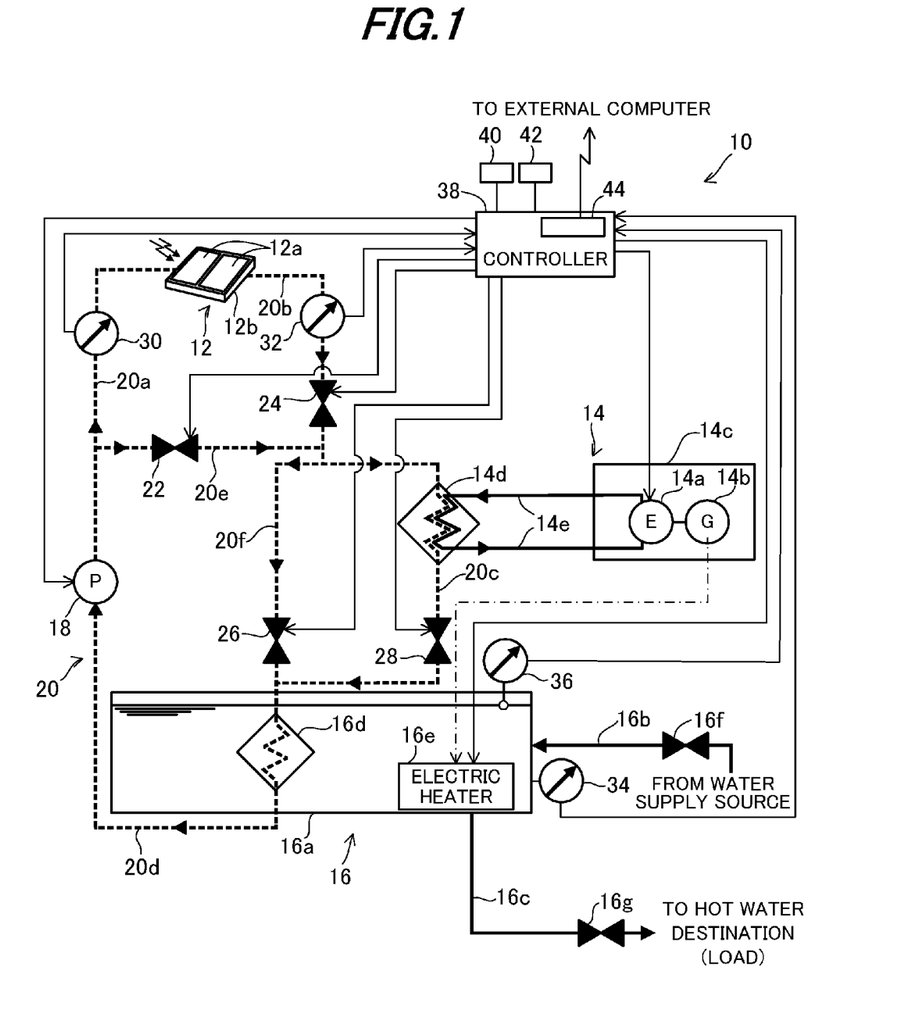
FIG. 1 is a schematic view giving an overall view of a hot water supply system according to an embodiment of this invention.

FIG. 1 is a schematic view giving an overall view of a hot water supply system according to an embodiment of this invention. In the drawing, thick solid lines indicate passages of (hot) water and coolant, broken lines flow of heating medium, thin solid lines signal lines, and thin dashed-dotted line flow of electric power.

In FIG. 1, reference numeral 10 designates the hot water supply system. The hot water supply system 10 comprises a solar heater 12, cogeneration unit 14 and hot water supply unit 16. The system 10 is for domestic use, in which the solar heater 12 is installed outside at a sunny location such as rooftop of a building, while the cogeneration unit 14 and hot water supply unit 16 are installed near a place where power is needed such as a bathroom or kitchen.

The solar heater 12 has a case 12b of flat box shape which is, for instance, 2 meters wide, 1 meter long and 0.1 meter high and is attached on its top surface with a glass plate 12a. The heating medium is filled in the case 12b and flowed in/out from the case 12b from/to flow passages 20 by the operation of a pump 18 connected to the solar heater 12. The heating medium in the case 12b is heated by solar heat. Ethylene glycol solution is used as the heating medium.

The cogeneration unit 14 is equipped with a main body 14c having an internal combustion engine (denoted "E" in FIG. 1) 14a and generator ("G") 14b driven by the engine 14a, and an exhaust heater (heat exchanger) 14d for increasing the temperature of heating medium by using exhaust heat from the engine 14a. The exhaust heat of the engine 14a is forwarded through a coolant passage 14e to the exhaust heater 14d, where it is heat-exchanged with the heating medium flowed therein. The engine 14a is a single-cylinder, four-cycle, water-cooled, spark-ignition, OHV engine that runs on city gas or LP (liquefied petroleum) gas and has a displacement of, for example, 163 cc.

The hot water supply unit 16 is equipped with a hot water tank 16a, a water supply pipe 16b for supplying water to the tank 16a, and a hot water supply pipe 16c for supplying hot water heated in the tank 16a to a hot water destination (load). The tank 16a is provided with a heat exchanger 16d for heat-exchanging between the heating medium and water so that the water is heated by heat of the heating medium. The tank 16a is also installed with an electric heater 16e having an electric heating wire to further heat the water, which has been heated through heat exchange, by using power generated by the generator 14b.

The water supply pipe 16b is provided with a feed-water valve (open/close valve) 16f and when it is opened, water is supplied from a water supply source to the tank 16a. The hot water supply pipe 16c is similarly provided with a feed-hot-water valve (open/close valve) 16g and when it is opened, hot water is supplied to the hot water destination.

Explaining circulation of the heating medium, the pump 18 is connected to the solar heater 12 through a flow passage 20a to pump the heating medium into the solar heater 12. The heating medium is heated by solar heat in the solar heater 12 and flowed out to a flow passage 20b. The flow passage 20b is connected to the exhaust heater 14d, where the heating medium is further heated by exhaust heat of the engine 14a.

The heated heating medium flows through a flow passage 20c and enters the heat exchanger 16d, where it is heat-exchanged with water in the tank 16a to be cooled down. The cooled heating medium returns to the pump 18 through a flow passage 20d and is again forwarded to the solar heater 12. Thus the solar heater 12 and exhaust heater 14d are connected in series and the heating medium is heated by the both.

A first bypass 20e is installed to bypass the solar heater 12 by interconnecting the flow passages 20a and 20b. When a first open/close valve (first valve) 22 installed in the first bypass 20e is opened and a second open/close valve (second valve) 24 installed in the flow passage 20b is closed, the heating medium is not forwarded to the solar heater 12 but remains to be heated only by the exhaust heater 14d. The initial statuses of the first and second valves 22, 24 are closed status and opened status, respectively.

A second bypass 20f is installed to bypass the exhaust heater 14d by interconnecting the flow passages 20b and 20c. When a third open/close valve (third valve) 26 installed in the second bypass 20f is opened and a fourth open/close valve (fourth valve) 28 installed in the flow passage 20c is closed, the heating medium is not forwarded to the exhaust heater 14d but remains to be heated only by the solar heater 12. The initial statuses of the third and fourth valves 26, 28 are opened status and closed status, respectively.

A first temperature detector 30 is installed at the flow passage 20a to produce an output or signal indicative of temperature of the heating medium flowed in the solar heater 12. A second temperature detector 32 is installed at the flow passage 20b to produce an output or signal indicative of temperature of the heating medium flowed out from the solar heater 12.

A third temperature detector 34 is installed at the tank 16a to produce an output or signal indicative of temperature of water in the tank 16a. A water amount detector 36 is installed at the tank 16a to produce an output or signal representing an amount of water in the tank 16a. The signals of the foregoing temperature detectors 30, 32, 34 and water amount detector 36 are sent to a controller 38.

The controller 38 having a microcomputer including a CPU, ROM, memory, input/output circuits and other devices controls the operations of the cogeneration unit 14, electric heater 16e, pump 18 and valves 16f, 16g, 22, 24, 26, 28.

The controller 38 is connected to a data input device 40 adapted to input initial setting data and operation setting data of the system 10 and a display 42 that displays the above data and the operating condition of the system 10. The controller 38 is also provided with a communication device 44 capable of transmitting/receiving data to/from an external computer. Specifically, based on the setting data inputted in advance and the signals sent from the foregoing detectors, the controller 38 controls the operations of the cogeneration unit 14 and the like.

Figure 2:
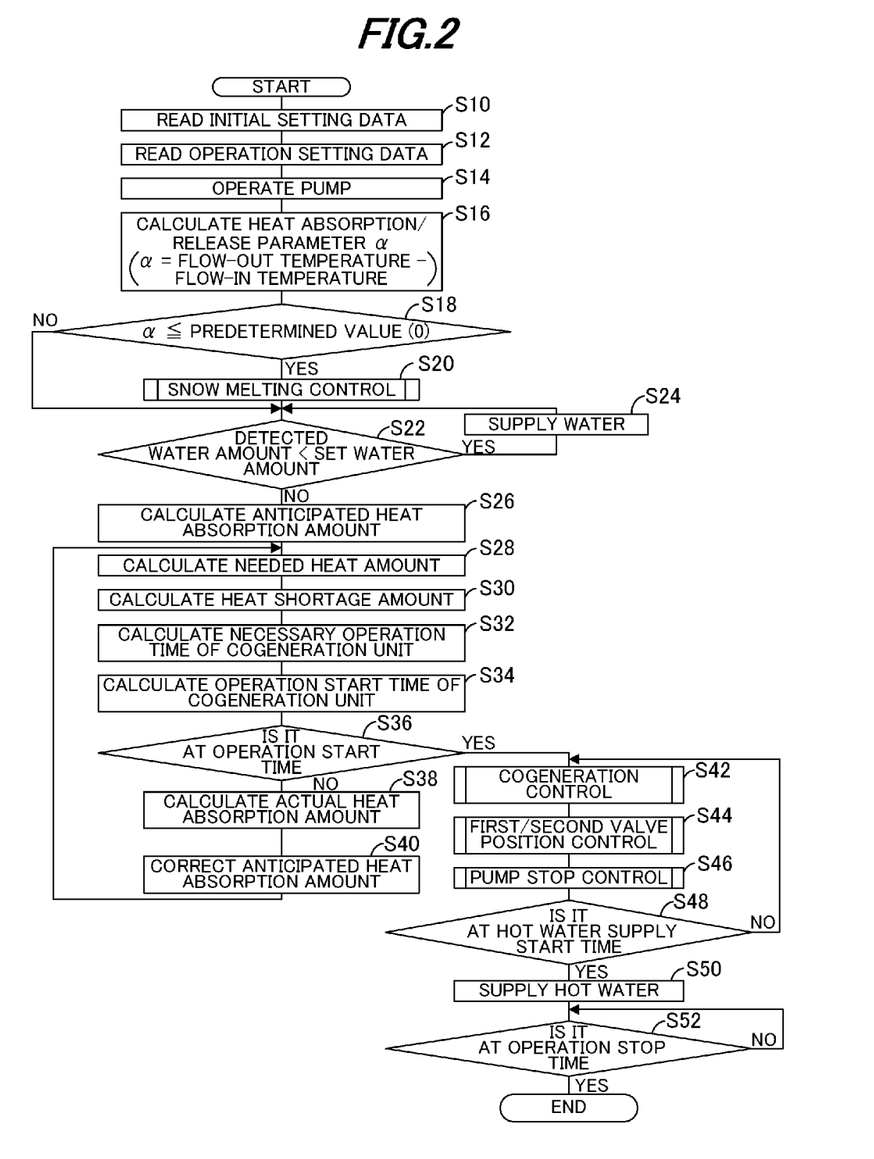
FIG. 2 is a flowchart showing the operation of the system shown in FIG. 1.

FIG. 2 is a flowchart showing the operation of the system 10. The illustrated program is executed by the controller 38 when the system 10 is powered ON (activated). The system 10 is to be powered on shortly before sunrise.

The program begins at S10, in which the initial setting data of the system 10 is read. The initial setting data is set beforehand when the system 10 is installed at an individual residence like house and includes a rated conversion efficiency, effective heat absorption area, installation direction and installation angle (relative to the horizontal surface) of the solar heater 14d, rated heat outputs of the exhaust heater 14d and electric heater 16e, and solar radiation data of installed location. The installation direction and angle of the solar heater 12 are set as an installation direction coefficient and installation angle coefficient used for correcting the rated conversion efficiency.

Figure 3:
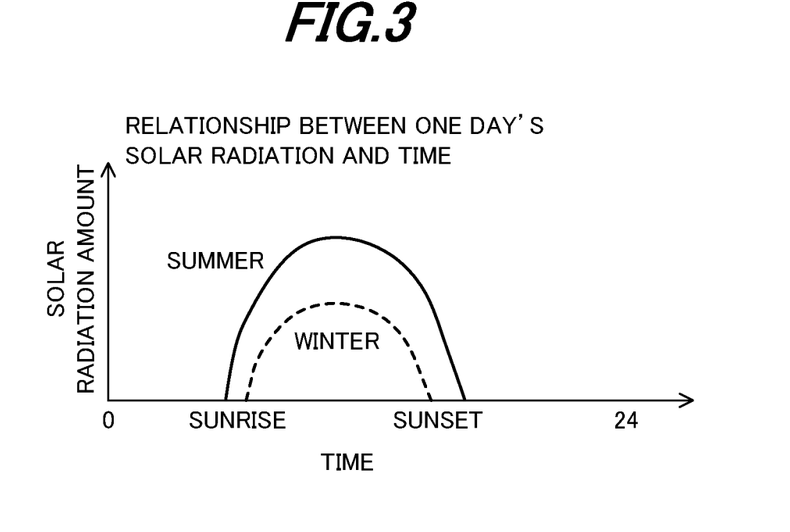
FIG. 3 is an explanatory view of solar radiation data set in a controller shown in FIG. 1.

FIG. 3 is an explanatory view of the solar radiation data set in the controller 38 beforehand.

The solar radiation data is numerical data of transition of solar radiation quantity at predetermined time interval from sunrise until sunset, which data is obtained every several days over one year, as shown in the drawing.

The program then proceeds to S12, in which the operation setting data of the system 10 is read. The operation setting data is prepared before the system 10 is operated and includes data of amount and temperature of water to be stored in the tank 16, hot water supply start time of the tank 16, and operation stop time of the system 10. The operation setting data also includes predetermined values which will be explained later.

The program then proceeds to S14, in which the pump 18 is operated. The pump 18 is operated with power supplied from an appropriate power source.

The program next proceeds to S16, in which a heat absorption/release parameter $\alpha$ of the solar heater 12 is calculated. Specifically, as shown in FIG. 2, the parameter $\alpha$ is obtained by subtracting the temperature (flow-in temperature) of the heating medium flowed in the solar heater 12 from the temperature (flow-out temperature) thereof flowed out from the solar heater 12.

The program then proceeds to S18, in which it is determined whether the parameter $\alpha$ is equal to or less than a predetermined value (i.e., 0). When the result is Yes, it is determined that the heating medium releases heat in the solar heater 12, i.e., accumulated snow on the solar heater 12 prevents the heating medium from absorbing solar heat, resulting in heat loss of the heating medium. Thus, the processing in this step amounts for estimating a heat absorption amount to be adsorbed by the solar heater 12.

The program then proceeds to S20, in which a snow melting control process is conducted.

Figure 4:
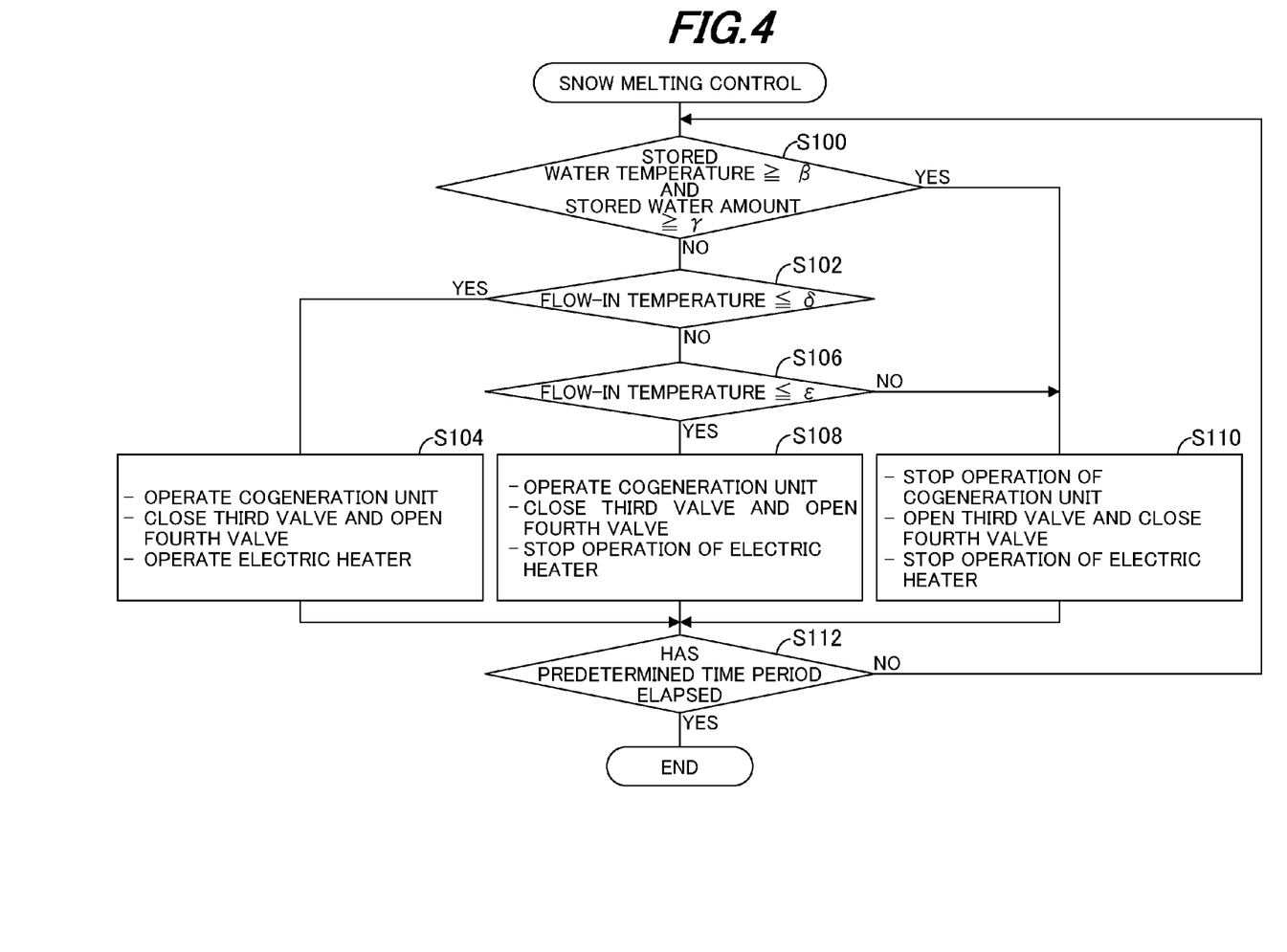
FIG. 4 is a subroutine flowchart showing a snow melting control process of FIG. 2.

FIG. 4 is a subroutine flowchart showing the process.

In S100, it is determined whether the temperature (stored water temperature) detected by the third temperature detector 34 is equal to or greater than a predetermined temperature $\beta$ (e.g., 40° C.) and the water amount (stored water amount) detected by the water amount detector 36 is equal to or greater than a predetermined amount $\gamma$ (e.g., 100 liters).

When the result in S100 is No, the program proceeds to S102, in which it is determined whether the temperature (flow-in temperature) detected by the first temperature detector 30 is equal to or less than a predetermined temperature δ (e.g., 20° C.).

When the result in S102 is Yes, the program proceeds to S104, in which the cogeneration unit 14, precisely, the engine 14a is operated. As a result, the generator 14b is driven to generate power and exhaust heat generated through the engine operation is forwarded to the exhaust heater 14d. Also, the third valve 26 is closed and the fourth valve 28 is opened so that the heating medium flowing through the exhaust heater 14d is heated therein. Further, the electric heater 16e is operated to heat water in the tank 16a.

Specifically, in S104, since the temperature of the heating medium flowed in the solar heater 12 is low, the cogeneration unit 14 is operated to heat the heating medium using the exhaust heater 14d, while the electric heater 16e is operated to heat water to be supplied, thereby greatly increasing the temperature of the heating medium flowed in the solar heater 12.

When the result in S102 is No, the program proceeds to S106, in which it is determined whether the detected flow-in temperature is equal to or less than a second predetermined temperatures (e.g., 30° C.) that is set greater than the predetermined temperature δ.

When the result in S106 is Yes, the program proceeds to S108, in which similarly to S104, the cogeneration unit 14 is operated and the third and fourth valves 26, 28 are closed and opened, respectively. On the other hand, the operation of the electric heater 16e is stopped.

Specifically, in S108, since the temperature of the heating medium flowed in the solar heater 12 is medium, the cogeneration unit 14 is operated to heat the heating medium using the exhaust heater 14d, while the operation of the electric heater 16e is stopped, thereby slightly increasing the temperature of the heating medium flowed in the solar heater 12.

When the result is No, proceeding to S110, in which the operation of the cogeneration unit 14 is stopped, the third valve 26 is opened, the fourth valve 28 is closed, and the operation of the electric heater 16e is stopped.

Specifically, since the temperature of the heating medium flowed in the solar heater 12 is high and further heating is not necessary, the operations of the cogeneration unit 14 and electric heater 16e are stopped. The third and fourth valves 26, 28 are opened and closed, respectively, to avoid heat loss of the heating medium in the exhaust heater 14d to which no exhaust heat is forwarded.

When the result in S100 is Yes, also the program proceeds to S110 because the residual heat still sufficiently remains in the tank 16a and hence, the heating medium to be heat-exchanged therein can maintain its high temperature.

The program then proceeds to S112, in which it is determined whether a predetermined time period (e.g., 30 minutes) has elapsed in this subroutine program. When the result is No, it is determined that snow melting has not been completed and the program returns back to S100.

When the result is Yes, since it is determined that snow melting has been completed, the operations of the cogeneration unit 14 and electric heater 16e are stopped, if operated, and the third and fourth valves 26, 28 are returned to their initial positions, whereby the program is terminated.

Returning to the explanation of FIG. 2 flowchart, the program then proceeds to S22, in which it is determined whether the water amount detected by the water amount detector 36 is less than a set water amount. When the result in S22 is Yes, the program proceeds to S24, in which the feed-water valve 16f is opened to supply water.

When the result in S22 is No, i.e., the detected water amount reaches the set water amount, the program proceeds to S26, in which an anticipated heat absorption amount through the solar heater 12 for one day is calculated, as follows.

$$\text{One day's anticipated heat absorption amount} = \text{One day's solar radiation amount} \times \text{Rated conversion efficiency} \times \text{Effective heat absorption area} \times \text{Installation direction coefficient} \times \text{Installation angle coefficient} \qquad \text{Eq. 1}$$

The one day's solar radiation amount is obtained by summing solar radiation amounts from sunrise until sunset on that day based on the solar radiation data. Thus, the processing in this step amounts for estimating a heat absorption amount to be adsorbed by the solar heater 12.

The program then proceeds to S28, in which a heat amount needed in the system 10 on that day is calculated, as follows.

$$\text{Needed heat amount} = \text{Detected water amount} \times (\text{Set temperature} - \text{Stored water temperature}) \qquad \text{Eq. 2}$$

The stored water temperature is detected by the third temperature detector 34, as mentioned above.

The program then proceeds to S30, in which a heat shortage amount is calculated, as follows.

$$\text{Heat shortage amount} = \text{Needed heat amount} - \text{One day's anticipated heat absorption amount} \qquad \text{Eq. 3}$$

The program then proceeds to S32, in which two kinds of necessary operation times of the cogeneration unit 14 are calculated, as follows.

$$\text{Necessary operation time} = \text{Heat shortage amount} / \text{Rated heat output of exhaust heater} \qquad \text{Eq. 4}$$

$$\text{Necessary operation time} = \text{Heat shortage amount} / (\text{Rated heat output of exhaust heater} + \text{Rated heat output of electric heater}) \qquad \text{Eq. 5}$$

Equation 4 is for the case where water is not heated by the electric heater 16e and Equation 5 is for the case where the heating medium is heated by the exhaust heater 14d and water is heated by the electric heater 16e. When the result of Equation 4 is a predetermined time period (e.g., 12 hours) or more, it is determined that the both heaters 14d and 16e are to be operated and the result of Equation 5 is applied. In contrast, when the result of Equation 4 is less than the predetermined time period, it is determined that water is not heated by the electric heater 16e and the result of Equation 4 is applied.

The program then proceeds to S34, in which the operation start time of the cogeneration unit 14 is calculated, as follows.

$$\text{Operation start time} = \text{Hot water supply start time} - \text{Necessary operation time} \qquad \text{Eq. 6}$$

In the case where the electric heater 16e is operated to heat water, since power generation by the generator 14b is started upon start of the cogeneration unit 14, the electric heater 16 can also be started with the generated power at the same operation start time.

The program then proceeds to S36, in which it is determined whether it is at the operation start time of the cogeneration unit 14. The current time is acquired through a timer or the like. When the result is No, the program proceeds to S38, in which an actual heat absorption amount through the solar heater 12 is calculated, as follows.

$$\text{Actual heat absorption amount } (n) = \text{Actual heat absorption amount } (n-1) + (\text{Flow-out temperature} - \text{Flow-in temperature}) \times \text{Heating medium flow rate} \times \text{Heating medium specific heat} \times \text{Heating medium specific gravity} \qquad \text{Eq. 7}$$

The flow-out temperature and flow-in temperature are detected by the second and first temperature detectors 32, 30, respectively. The heating medium flow rate, which depends on discharge force of the pump 18, is a flow rate of the heating medium flowing through the solar heater 12 during the program loop. The heating medium specific heat and specific gravity are material properties (constants) of the heating medium. The number n is a counter value of the program loop and the actual heat absorption amount (n) is of this program loop, while the amount (n−1) is of the previous program loop.

The program then proceeds to S40, in which the anticipated heat absorption amount is corrected. Specifically, the one day's anticipated heat absorption amount calculated in S26 is corrected based on the actual heat absorption amount calculated in S38. To be more specific, the one day's anticipated heat absorption amount is multiplied by a ratio of the actual heat absorption amount to an anticipated heat absorption amount until the current time, as follows.

Corrected anticipated heat absorption amount=One day's anticipated heat absorption amount×Actual heat absorption amount/Anticipated heat absorption amount until current time    Eq. 8

The anticipated heat absorption amount until the current time is calculated as follows:

Anticipated heat absorption amount until current time=Solar radiation amount until current time× Rated conversion efficiency×Effective heat absorption area×Installation direction coefficient×Installation angle coefficient    Eq. 9

The solar radiation amount until the current time is obtained by summing solar radiation amounts from sunrise until the current time on that day based on the solar radiation data.

The program then returns back to S28, in which the needed heat amount is again calculated based on the corrected anticipated heat absorption amount. Then, based on the newly-obtained needed heat amount, the calculations of S30 to S34 are again carried out. In other words, the actual heat absorption amount is calculated, the anticipated heat absorption amount is corrected based thereon, and the operation start time of the cogeneration unit 14 is newly calculated, continuously until reaching the operation start time.

When the result in S36 is Yes, the program then proceeds to S42, in which a control process of the cogeneration unit 14 operation is conducted.

Figure 5:
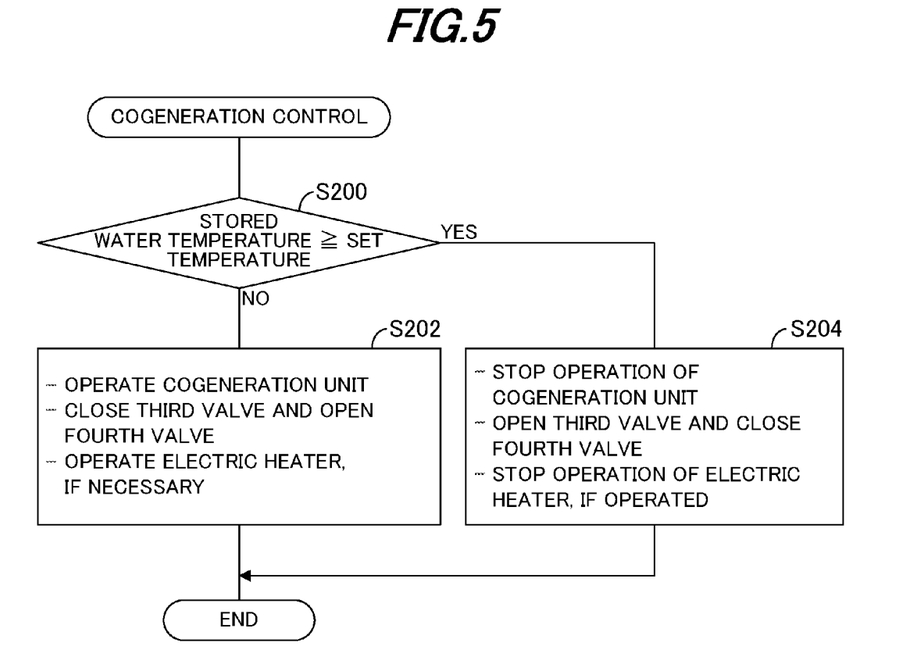
FIG. 5 is a subroutine flowchart showing a cogeneration control process of FIG. 2.

FIG. 5 is a subroutine flowchart showing the process, i.e., cogeneration control process.

In S200, it is determined whether the temperature (stored water temperature) detected by the third temperature detector 34 is equal to or greater than the set temperature.

When the result is No, the program proceeds to S202, in which the cogeneration unit 14, precisely, the engine 14a is operated. As a result, the generator 14b is driven to generate power and exhaust heat generated through the engine operation is forwarded to the exhaust heater 14d. Also, the third valve 26 is closed and the fourth valve 28 is opened so that the heating medium is heated in the exhaust heater 14d. Further, the electric heater 16e is operated to heat water in the tank 16a, if the water heating is necessary.

On the other hand, when the result in S200 is Yes, the program proceeds to S204, in which the operation of the cogeneration unit 14, i.e., the engine 14a is stopped. Consequently, it discontinues power generation by the generator 14b and transfer of exhaust heat to the exhaust heater 14d. Also, the third valve 26 is opened and the fourth valve 28 is closed so that the exhaust heater 14d is bypassed to prevent the heating medium from flowing in the exhaust heater 14d.

Specifically, since the heating medium is prevented from flowing through the exhaust heater 14d when the exhaust heat is not transferred, it makes possible to avoid heat loss of the heating medium. In the case where the electric heater 16e is operated, the operation thereof is stopped.

Returning to the explanation of FIG. 2 flowchart, the program then proceeds to S44, in which a process for changing positions of the first and second valves is conducted.

Figure 6:
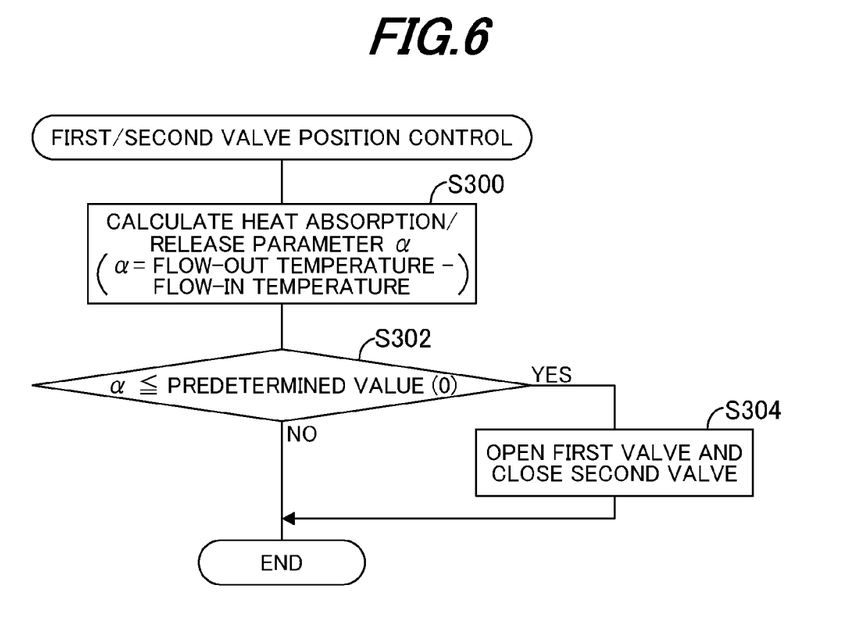
FIG. 6 is a subroutine flowchart showing a first/second valve position control process of FIG. 2.

FIG. 6 is a subroutine flowchart showing the first/second valve position control process.

In S300, the heat absorption/release parameter α of the solar heater 12 is again calculated. In S302, it is determined whether the parameter α is equal to or less than a predetermined value (i.e., 0). When the result is Yes, it is determined that the heating medium releases heat in the solar heater 12, and the program proceeds to S304, in which the first valve 22 is opened and the second valve 24 is closed so that the solar heater 12 is bypassed to prevent the heating medium from flowing in the solar heater 12.

On the other hand, when the result in S302 is No, it is determined that the heating medium is absorbing heat in the solar heater 12 and the program is terminated.

Returning to the explanation of FIG. 2 flowchart, the program then proceeds to S46, in which a pump stop control process is conducted.

Figure 7:
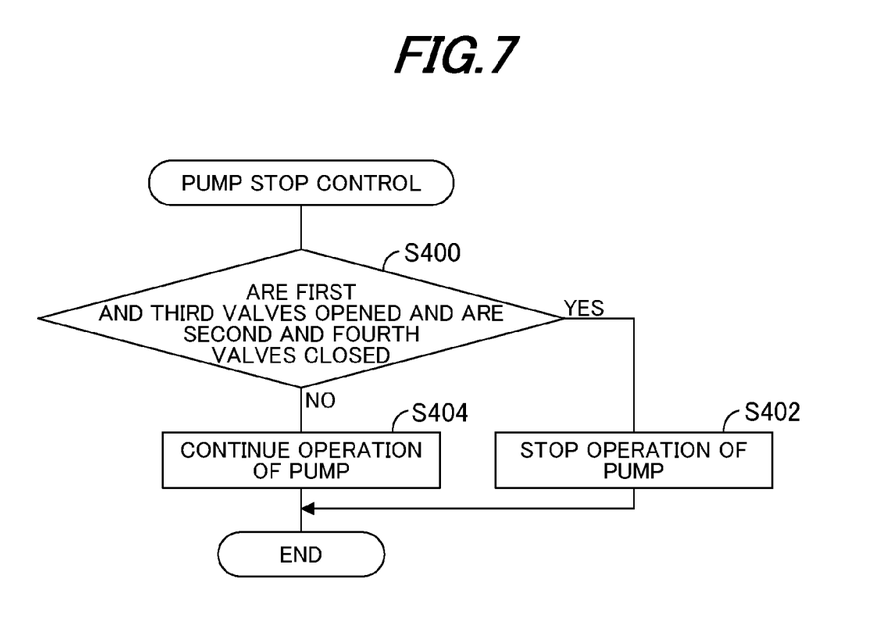
FIG. 7 is a subroutine flowchart showing a pump stop control process of FIG. 2.

FIG. 7 is a subroutine flowchart showing the process.

In S400, it is determined whether the first and third valves 22, 26 are both opened and the second and fourth valves 24, 28 are both closed. When the result is Yes, since it means that the solar heater 12 and exhaust heater 14d are both bypassed, it is determined to be unnecessary to circulate the heating medium and the program proceeds to S402, in which the operation of the pump 18 is stopped. When the result in S400 is No, the program proceeds to S404, in which the pump 18 operation is continued.

Returning to the explanation of FIG. 2 flowchart, the program then proceeds to S48, in which it is determined whether it is at the hot water supply start time. When the result is No, the program returns back to S42, while, when the result is Yes, proceeding to S50, in which the feed-hot-water valve 16g is opened to start supplying hot water. Hot water supply is started (by closing the valve 16g) and stopped (by opening the valve 16g) by the operator when needed.

The program then proceeds to S52, in which it is determined whether it is at the operation stop time of the system 10. When the result is Yes, the system 10 is powered off and the program is terminated.

As stated above, the embodiment is configured to have a hot water supply system (10) and method adapted to generate hot water to be supplied to a hot water destination (load), comprising: a solar heater (12) that absorbs solar heat and heats a heating medium with the absorbed solar heat; a cogeneration unit (14) that has an internal combustion engine (14a) and a generator (14b) driven by the engine to generate power to be supplied to a power destination (load), and heats the heating medium by heat exhausted from the engine; a hot water supply unit (16) that has a heat exchanger (16d) for heat-exchanging between the heating medium and water supplied from a water supply source to generate the hot water; a heating medium circulator (pump 18) that circulates the heating medium among the solar heater, the cogeneration unit and the heat exchanger of the hot water supply unit; an electric heater (16e) that heats the hot water with the power generated by the generator of the cogeneration unit; a heat absorption amount estimator (controller 38, S16-S26) that estimates a heat absorption amount to be adsorbed by the solar heater; and a controller (38, S28, S30, S36, S100-S112) that controls operations of the cogeneration unit (14) and the electric heater (16e) based on the estimated heat absorption amount.

Thus, since the water is surely heated taking the estimated heat absorption amount into account, the operation time of the cogeneration unit (14) and electric heater (16e) can be shortened, thereby improving energy efficiency of the entire system (10). Further, since the heating medium heated by the solar heater (12) is further heated by exhaust heat of the engine (14a) and the water heated by the heat exchanger (16d) is further heated with power generated by the generator (14b), it becomes possible to heat the water without relying on late-night power.

In the system and method, the heat absorption amount estimator estimates the heat adsorption amount based on solar radiation data that is predetermined beforehand (S26). Specifically, the system and method further includes: a hot water supply start time setter (data input device 40) that sets a hot water supply start time at which the hot water supply unit starts supply of the hot water; and the controller controls the operations of the cogeneration unit (14) and the electric heater (16e) based on the set hot water supply start time and the estimated heat absorption amount (S26). With this, it becomes possible to heat the water in accordance with the start time of hot water supply, thereby eliminating the necessity of keeping the heated water warm for a long period of time, thereby improving energy efficiency of the entire system (10).

The system and method further includes: a first temperature detector (30) that detects a first temperature indicative of the heating medium flowing in the solar heater; a second temperature detector (32) that detects a second temperature indicative of the heating medium flowing out of the solar heater; and an actual heat absorption amount calculator (controller 38, S38) that calculates an actual heat absorption amount adsorbed by the solar heater based on the first temperature and the second temperature; and the heat absorption amount estimator corrects the estimated heat adsorption amount based on the calculated actual heat absorption amount (S40). Specifically, the controller controls the operations of the cogeneration unit (14) and the electric heater (16e) based on the set hot water supply start time and the corrected estimated heat absorption amount. With this, it becomes possible to heat the water in accordance with the start time of hot water supply more accurately. Also, the operation time of the cogeneration unit (14) and electric heater (16e) can be shortened more, thereby further improving energy efficiency of the entire system (10).

The system and method further includes: a preventer (controller 38, S38, S200-S204) that prevents the heating medium from flowing in the solar heater when a difference between the first temperature and the second temperature is equal to or less than a predetermined value (zero). With this, since the heating medium is prevented from flowing in the solar heater (12) when being likely to release heat therein, it becomes possible to avoid heat loss of the heating medium, whereby the heating medium heating operation by the cogeneration unit (14) and the water heating operation by the electric heater (16e) are not hampered.

The system and method further includes: a snow accumulation determiner (controller 38, S16-S18) that determines whether snow accumulates on the solar heater, and the heat absorption amount estimator estimates the heat adsorption amount based on determination of the snow accumulation determiner (S20, S100-S112). Specifically, the controller controls the operations of the cogeneration unit (14) and the electric heater (16e) such that a temperature of the heating medium flowing in the solar heater increases when the snow accumulation determiner determines that the snow accumulates on the solar heater. With this, since the cogeneration unit (14) and electric heater (16e) adapted to heat water to be supplied are used to heat the heating medium flowed in the solar heater (12), it becomes possible to melt snow without providing the solar heater (12) with a device for snow melting. Accordingly, the solar heater (12) can surely absorb solar heat to heat water to be supplied, thereby improving energy efficiency of the entire system (10).

The system and method further include: a first temperature detector (30) that detects a first temperature indicative of the heating medium flowing in the solar heater, and the controller operates at least the cogeneration unit (14) when the detected first temperature is equal to or less than a predetermined temperature (δ), while stop the cogeneration unit (14) and the electric heater (16e) when the detected first temperature is greater than the predetermined temperature (S102-S110). With this, since it becomes possible to adequately heat the heating medium flowed in the solar heater (12), even when the cogeneration unit (14) and electric heater (16e) are operated to melt snow, their operation time can be shortened to the utmost extent, thereby improving energy efficiency of the entire system (10).

The system and method further include: a second temperature detector (32) that detects a second temperature indicative of the heating medium flowing out of the solar heater, and the snow accumulation determiner determines whether the snow accumulates based on the detected first temperature and the second temperature (S16-s18). With this, it becomes possible to appropriately determine whether snow accumulates on the solar heater (12) with a simple structure.

In the system and method, the snow accumulation determiner determines that the snow accumulates on the solar heater (12) when a difference between the first temperature and the second temperature is equal to or less than a second predetermined value (zero). With this, it becomes possible to determine whether snow accumulates on the solar heater (12) further appropriately with a simple structure.

The system and method further include: a third temperature detector (34) that detects a third temperature indicative of the water in the water supply unit, and the controller controls the operations of the cogeneration unit and the electric heater based on the third temperature (S100-S110). With this, when the temperature of water in the tank is relatively high and the temperature of the heating medium flowed in the solar heater (12) is estimated high, the operations of the cogeneration unit (14) and electric heater (16e) for melting snow can be stopped, so that their operation time can be shortened to the utmost extent.

It should be noted that, instead of the Ethylene glycol solution, other liquid or gas can be applied as the heating medium.

It should also be noted that the flow-in temperature used in S102 and S104 can be replaced by the flow-out temperature.

Japanese Patent Application Nos. 2009-185135 and 2009-185136, both filed Aug. 7, 2009, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A hot water supply system adapted to generate hot water to be supplied to a hot water destination, said hot water supply system comprising:

a solar heater that absorbs solar heat and heats a heating medium with the absorbed solar heat;

a cogeneration unit that has an internal combustion engine and a generator driven by the engine to generate power to be supplied to a power destination, and heats the heating medium by heat exhausted from the engine;

a hot water supply unit that has a heat exchanger for heat-exchanging between the heating medium and water supplied from a water supply source to generate the hot water;

a heating medium circulator that circulates the heating medium among the solar heater, the cogeneration unit and the heat exchanger of the hot water supply unit;

an electric heater that heats the hot water with the power generated by the generator of the cogeneration unit;

a heat absorption amount estimator that estimates a heat absorption amount to be adsorbed by the solar heater; wherein the heat absorption amount estimator estimates the heat absorption mount based on solar radiation data that is predetermined beforehand; a first temperature detector that detects a first temperature indicative of the heating medium flowing in the solar heater; a second temperature detector that detects a second temperature indicative of the heating medium flowing out of the solar heater; and an actual heat absorption amount calculator that calculates an actual heat absorption amount absorbed by the solar heater based on the first temperature and the second temperature; and the heat absorption amount estimator corrects the estimated heat absorption amount based on the calculated actual heat absorption amount and a controller that controls operations of the cogeneration unit and the electric heater to heat the heating medium based on the estimated heat absorption amount.

2. The system according to claim 1, further comprising:
a hot water supply start time setter that calculates a necessary operation time of the cogeneration unit and the electric heater and sets a hot water supply start time at which the hot water supply unit starts supply of the hot water based on the calculated necessary operation time; and the controller controls the operations of the cogeneration unit and the electric heater based on the set hot water supply start time and the estimated heat absorption amount.

3. The system according to claim 1, further comprising:
a hot water supply start time setter that calculates a necessary operation time of the cogeneration unit and the electric heater and sets a hot water supply start time at which the hot water supply unit starts supply of the hot water based on the calculated necessary operation time; wherein the controller controls the operations of the cogeneration unit and the electric heater based on the set hot water supply start time and the corrected estimated heat absorption amount.

4. The system according to claim 1, further comprising:
a first bypass that bypasses the solar heater, and a preventer that makes the heating medium flow through the first bypass so as to prevent the heating medium from flowing in the solar heater when a difference between the first temperature and the second temperature is equal to or less than a predetermined value.

5. The system according to claim 1, further comprising:
a snow accumulation determiner that determines whether snow is capable of accumulating on the solar heater, wherein the controller controls the operations of the cogeneration unit and the electric heater such that a temperature of the heating medium flowing in the solar heater increases when the snow accumulation determiner determines that the snow is capable of accumulating on the solar heater.

6. The system according to claim 1, further comprising:
a first temperature detector that detects a first temperature indicative of the heating medium flowing in the solar heater,
and the controller operates at least the cogeneration unit when the detected first temperature is equal to or less than a predetermined temperature, while stop the cogeneration unit and the electric heater when the detected first temperature is greater than the predetermined temperature.

7. The system according to claim 6, further comprising:
a second temperature detector that detects a second temperature indicative of the heating medium flowing out of the solar heater,
and the snow accumulation determiner determines whether snow is capable of accumulating based on the detected first temperature and the second temperature.

8. The system according to claim 1, further comprising:
a snow accumulation determiner that determines whether snow is capable of accumulating on the solar heater,
wherein the snow accumulation determiner determines that the snow is capable of accumulating on the solar heater when a difference between the first temperature and the second temperature is equal to or less than a second predetermined value.

9. The system according to claim 1, further comprising:
a third temperature detector that detects a third temperature indicative of the water in the water supply unit,
and the controller controls the operations of the cogeneration unit and the electric heater based on the third temperature.

10. A hot water supply method adapted to generate hot water to be supplied to a hot water destination by a hot water supply system having:
a solar heater that absorbs solar heat and heats a heating medium with the absorbed solar heat;
a cogeneration unit that has an internal combustion engine and a generator driven by the engine to generate power to be supplied to a power destination, and heats the heating medium by heat exhausted from the engine;
a hot water supply unit that has a heat exchanger for heat-exchanging between the heating medium and water supplied from a water supply source to generate the hot water;
a heating medium circulator that circulates the heating medium among the solar heater, the cogeneration unit and the heat exchanger of the hot water supply unit; and
an electric heater that heats the hot water with the power generated by the generator of the cogeneration unit;
said hot water supply method characterized by the steps of:
estimating a heat absorption amount to be adsorbed by the solar heater wherein the step of heat absorption amount estimating estimates the heat absorption amount based on solar radiation data that is predetermined beforehand; detecting a first temperature indicative of the heating medium flowing in the solar heater; detecting a second temperature indicative of the heating medium flowing out of the solar heater; and calculating an actual heat absorption amount absorbed by the solar heater based on the first temperature and the second temperature; and the step of the heat absorption amount estimating corrects the estimated heat absorption amount based on the calculated actual heat absorption amount; and controlling operations of the cogeneration unit and the electric heater to heat the heating medium based on the estimated heat absorption amount.

11. The method according to claim 10, further including the steps of:
calculating a necessary operation time of the cogeneration unit and the electric heater; and
setting a hot water supply start time at which the hot water supply unit starts supply of the hot water based on the calculated necessary operation time;
and wherein the step of controlling controls the operations of the cogeneration unit and the electric heater based on the set hot water supply start time and the estimated heat absorption amount.

12. The method according to claim 10, further comprising the steps of:
calculating a necessary operation time of the cogeneration unit and the electric heater; and
setting a hot water supply start time at which the hot water supply unit starts supply of the hot water based on the calculated necessary operation time;
and wherein the step of controlling controls the operations of the cogeneration unit and the electric heater based on the set hot water supply start time and the corrected estimated heat absorption amount.

13. The method according to claim 10, wherein the hot water supply system further comprises a first bypass that bypasses the solar heater, and wherein the method further comprises the step of:
preventing the heating medium from flowing in the solar heater by making the heating medium flow through the first bypass when a difference between the first temperature and the second temperature is equal to or less than a predetermined value.

14. The method according to claim 10, further comprising the steps of:
determining whether snow is capable of accumulating on the solar heater;
wherein the step of controlling controls the operations of the cogeneration unit and the electric heater such that a temperature of the heating medium flowing in the solar heater increases when step of the snow accumulation determining determines that the snow is capable of accumulating on the solar heater.

15. The method according to claim 10, further comprising the step of:
detecting a first temperature indicative of the heating medium flowing in the solar heater,
and wherein the step of controlling operates at least the cogeneration unit when the detected first temperature is equal to or less than a predetermined temperature, while stop the cogeneration unit and the electric heater when the detected first temperature is greater than the predetermined temperature.

16. The method according to claim 15, further comprising a step of:
detecting a second temperature indicative of the heating medium flowing out of the solar heater,
and wherein the step of snow accumulation determining determines whether the snow is capable of accumulating based on the detected first temperature and the second temperature.

17. The method according to claim 10, further comprising a step of:
determining whether snow is capable of accumulating on the solar heater;
and wherein the step of snow accumulation determining determines that the snow is capable of accumulating on the solar heater when a difference between the first temperature and the second temperature is equal to or less than a second predetermined value.

18. The method according to claim 10, further including the step of:
detecting a third temperature indicative of the water in the water supply unit,
and wherein the step of controlling controls the operations of the cogeneration unit and the electric heater based on the third temperature.

* * * * *